June 1, 1926. 1,586,564
E. R. LUNDIUS
TESTING SYSTEM
Filed Dec. 13, 1924 8 Sheets-Sheet 1

Inventor:
Eric R. Lundius.
by E.W. Adam Att'y

June 1, 1926.

E. R. LUNDIUS 1,586,564

TESTING SYSTEM

Filed Dec. 13, 1924    8 Sheets-Sheet 5

Inventor:
Eric R. Lundius.
by ℰ.W.Adams Att'y.

June 1, 1926.

E. R. LUNDIUS

TESTING SYSTEM

Filed Dec. 13, 1924

Inventor:
Eric R. Lundius
by E. W. Adams Att'y.

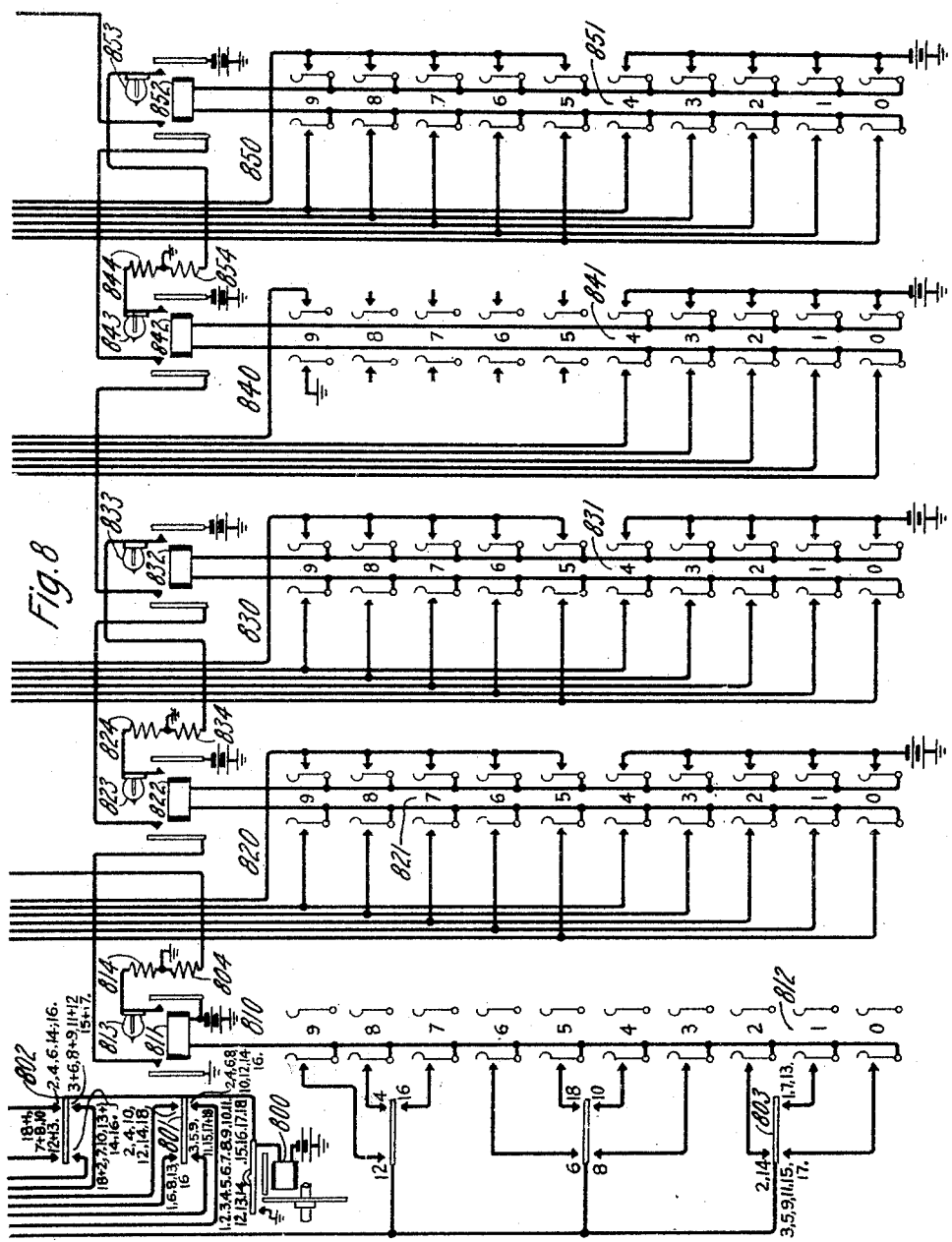

Patented June 1, 1926.

1,586,564

UNITED STATES PATENT OFFICE.

ERIC R. LUNDIUS, OF RICHMOND HILL, NEW YORK, ASSIGNOR TO WESTERN ELECTRIC COMPANY, INCORPORATED, OF NEW YORK, N. Y., A CORPORATION OF NEW YORK.

TESTING SYSTEM.

Application filed December 13, 1924. Serial No. 755,620.

This invention relates to telephone exchange systems and particularly to systems employing automatic switches for extending connections.

In large exchange areas it is customary to employ register senders for controlling the operation of selector switches in the extension of connections. These register senders include a plurality of registers which are set for an office code in accordance with dial interruptions from a subscriber's station. The registers control what is known as a translator, which in turn controls a number of operations greater than the number of digits which it is convenient to employ for an office code. It has been customary to make these translators an integral part of the register senders, but a later practice indicates that it is more economical to use common translators selected by senders as taken for use.

Heretofore the testing of the translators has been a function of the testing of the sender. It therefore required that either the sender was maintained out of service for a long time in order to make a complete test of the translator, or the test of the translator was more or less perfunctory.

With translators made common to a plurality of senders it becomes possible to test the translators independent of the senders.

It is an object of the invention to provide testing apparatus for testing sender-selected translators.

A feature of the invention lies in means for beginning a routine test of translators with any translator.

Another feature of the invention lies in means for setting a register of the test set from the translator and making the advance of the test depend upon the correct setting of this register.

Other features of the invention will be apparent from a consideration of the following description in connection with the drawings and appended claims.

In the drawings, Fig. 1 shows a translator and pulse machine.

Fig. 8 shows the keys which are employed in checking the setting of the registers of Fig. 5.

Fig. 9 shows the arrangement of the remaining figures for a complete disclosure of the invention.

Figure 1:
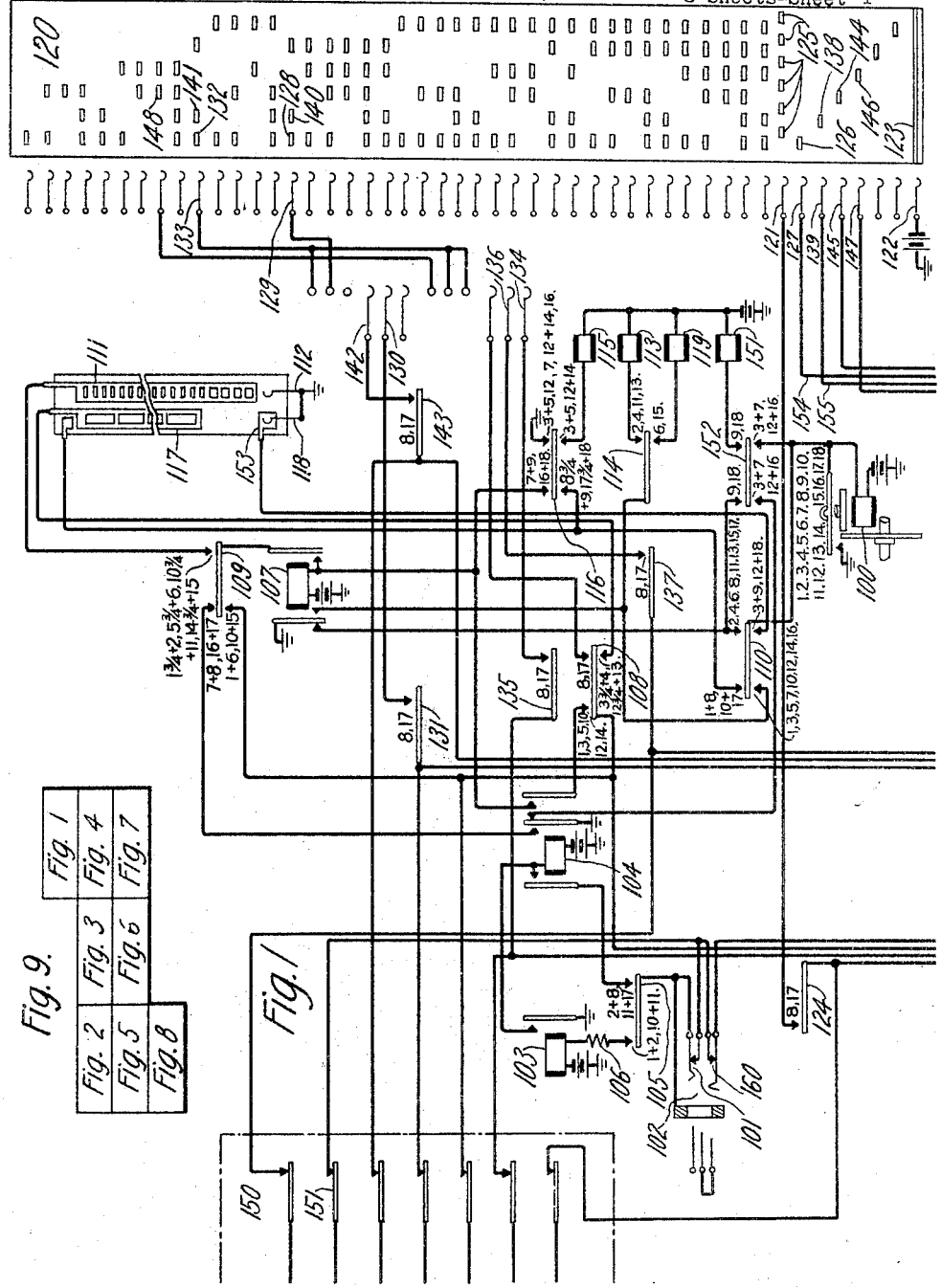

The translator of Fig. 1 is the same as that disclosed in the application of W. G. Blauvelt, Serial No. 31,659 filed May 20, 1925. The master switches and connector switches of Figs. 2 and 4 may be of any well known step-by-step type.

Before describing the operation of the system in detail, a brief description of the method of operation may be desirable. The testing device as shown is equipped to test a maximum of 400 translators. The master selectors 210, 220 and 230 serve to connect the test set with the translator connector switches shown in Fig. 4. The master switches 210 and 220 serve to extend circuits from the translator of Fig. 1 to the registers of Fig. 5. Switch 230 controls the advance of all three master selectors and extends certain of the circuits from the translator to the test set. The connector switches are arranged in pairs, 400 and 410 comprising one pair, 420 and 430 a second pair and 440 and 450 a third pair, as shown in the drawings. Switches 400 and 410 are connected to the No. 1 terminals of the master switches, 420 and 430 to the second terminals, 440 and 450 to the third terminals. For simplicity only switches 440 and 450 are shown with elaborations of the wiring. The connector switches serve to extend to a particular translator the circuits from the testing device which the master selectors have extended to a particular set of connector switches.

Figure 2:
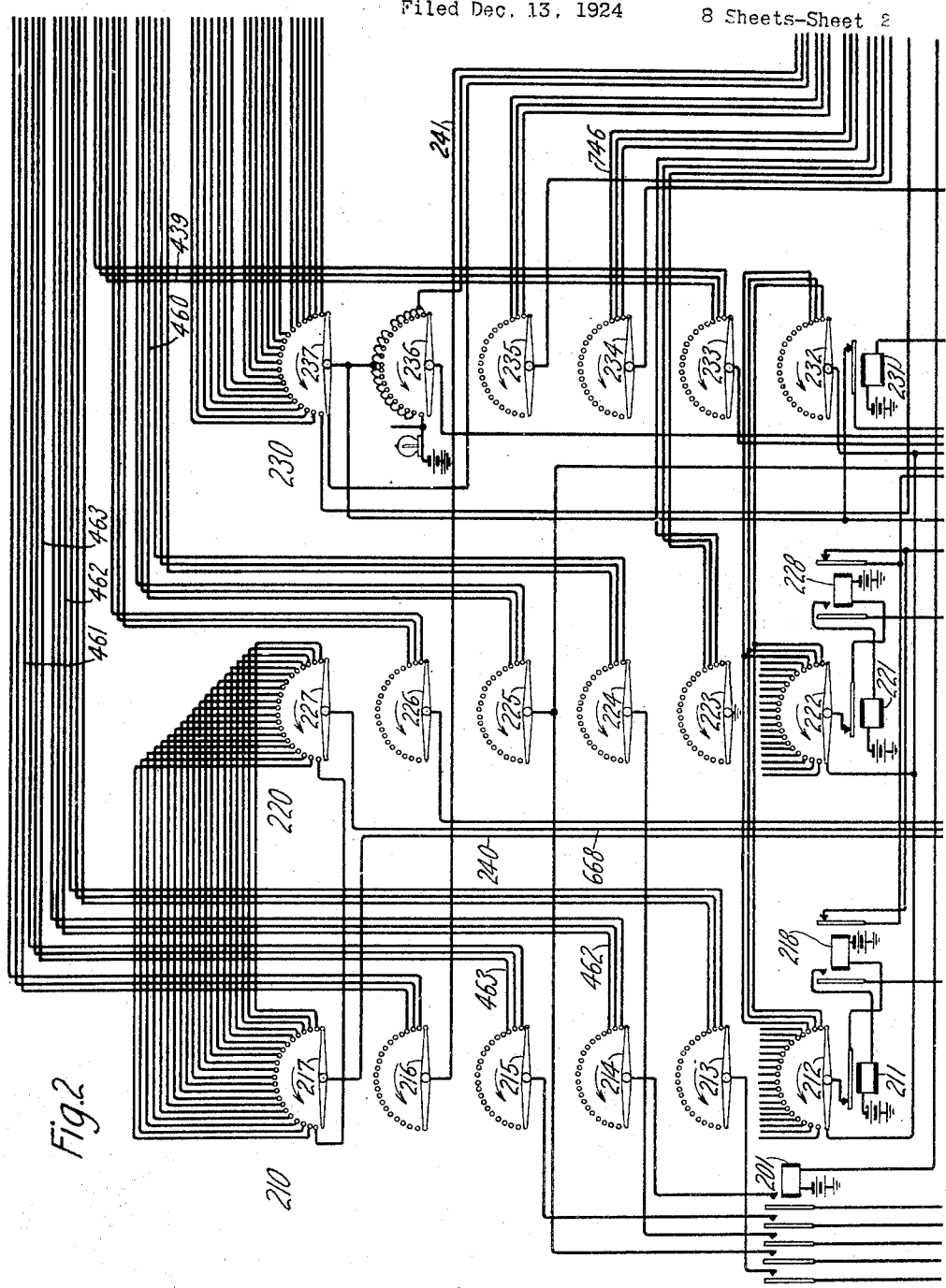
Fig. 2 shows the master selectors.
Figure 3:
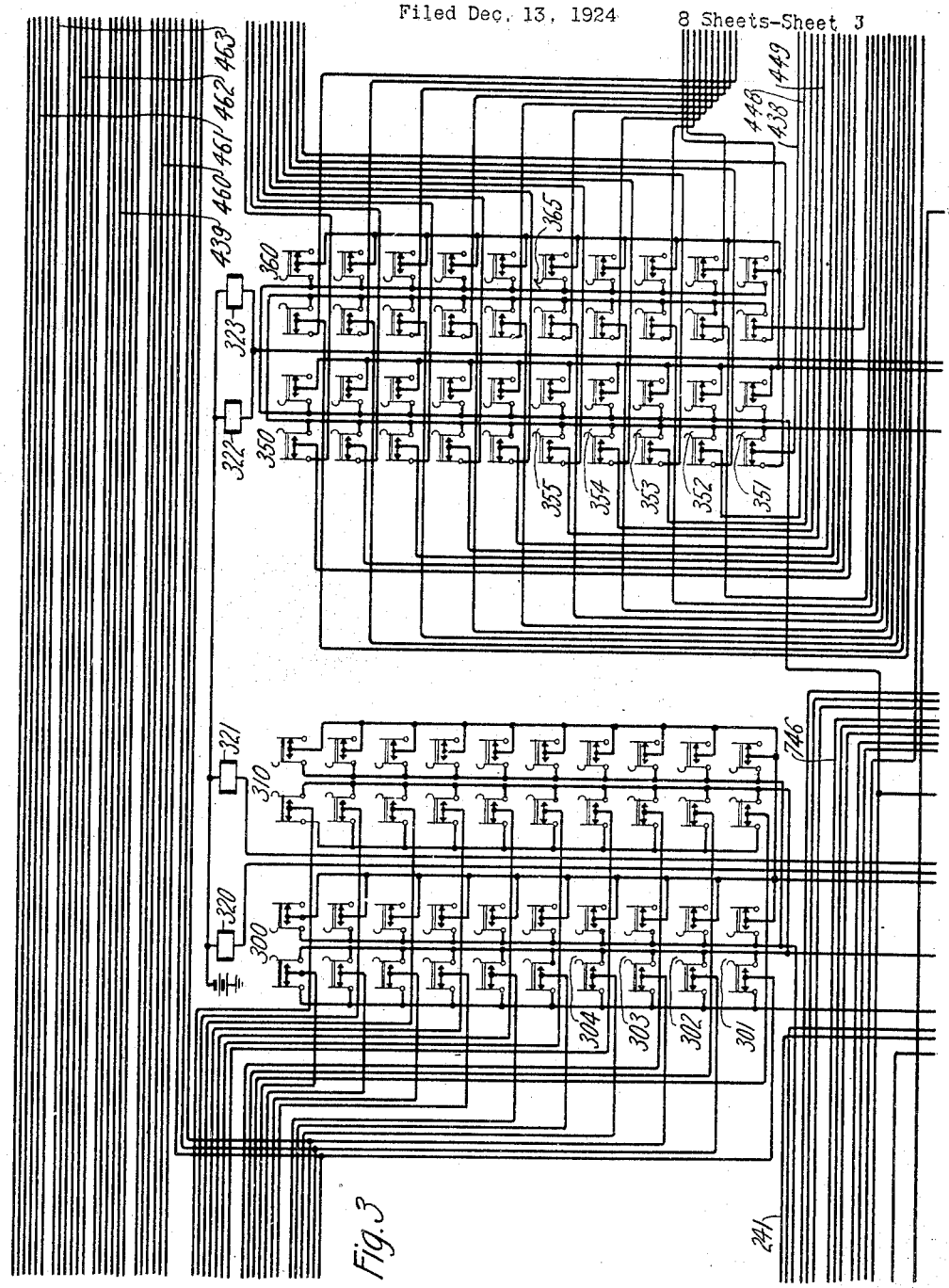
Fig. 3 shows the keys for controlling the selection of the translators.
Figure 4:
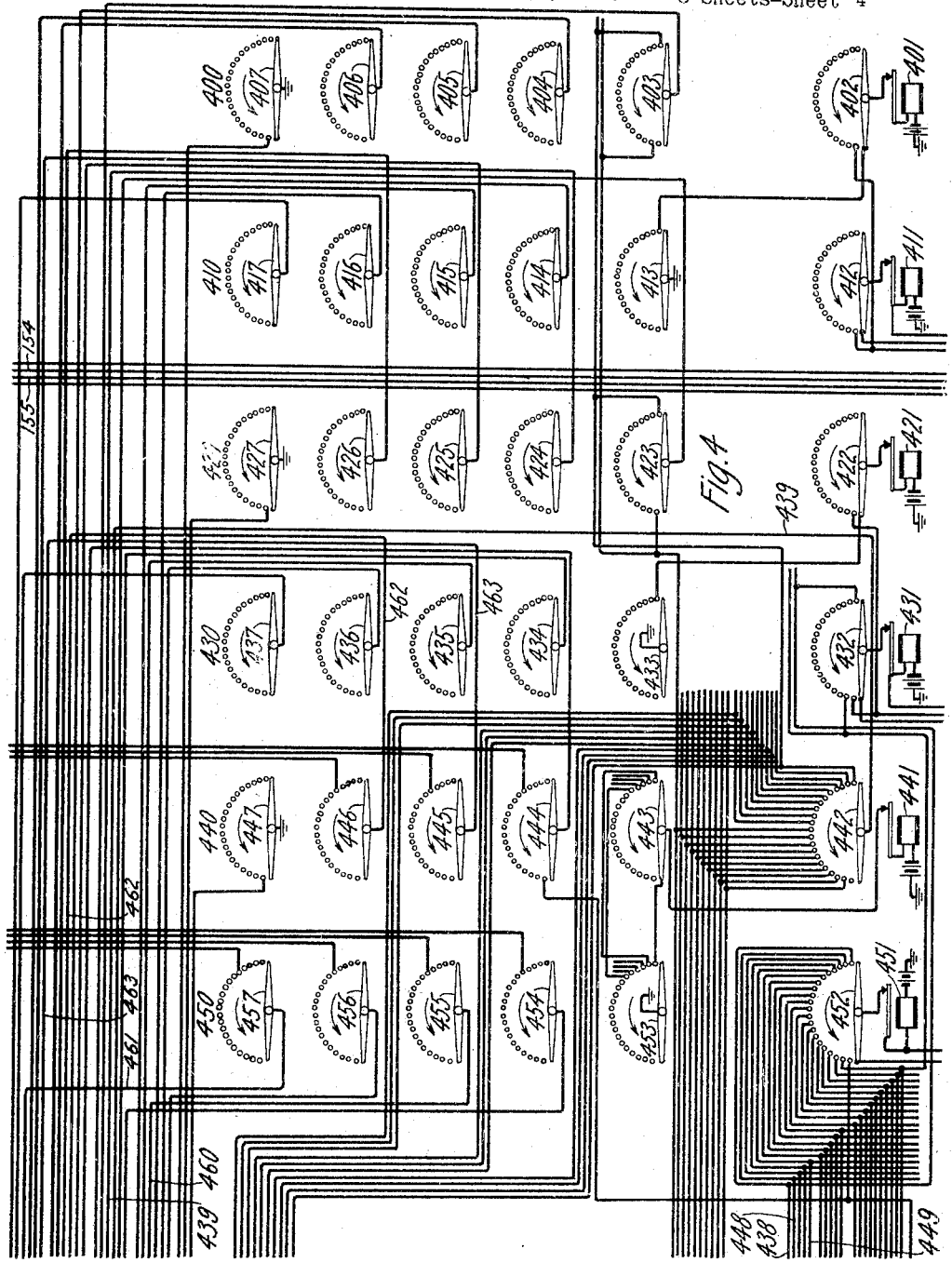
Fig. 4 shows three sets of connector switches for connecting to a particular translator.

The keys of Fig. 3 are used to direct the master and connector switches of Figs. 2 and 4 to the desired translator. A circuit is provided over the normal contact of a key of set 300 and 310 and a corresponding terminal on switch 230 in successive positions of the switch for operating a relay which controls the advance of switches 210, 220 and 230 from position to position until the position corresponding to the operated key is reached, at which time the above mentioned circuit is opened and the switches come to rest.

Similarly a path is closed for advancing switch 450 over the normal contact of a key of set 350 or 360 and terminals of switches 450 and 440 until the switch is in a position corresponding to the operated key. This circuit is completed only when both switches are in the same position. The above circuit is opened at the operated key and the switch is brought to rest. At each step a local circuit is closed, through arcs of switches 450 and 440 for stepping the switch 440 to the position corresponding to that of switch 450. In order to insure that all master and connector switches are connected with the same translator the circuit for initiating tests extends through an arc of each switch involved. If this circuit is not completed, the time alarm circuit functions to apprise the tester of trouble.

Figure 6:
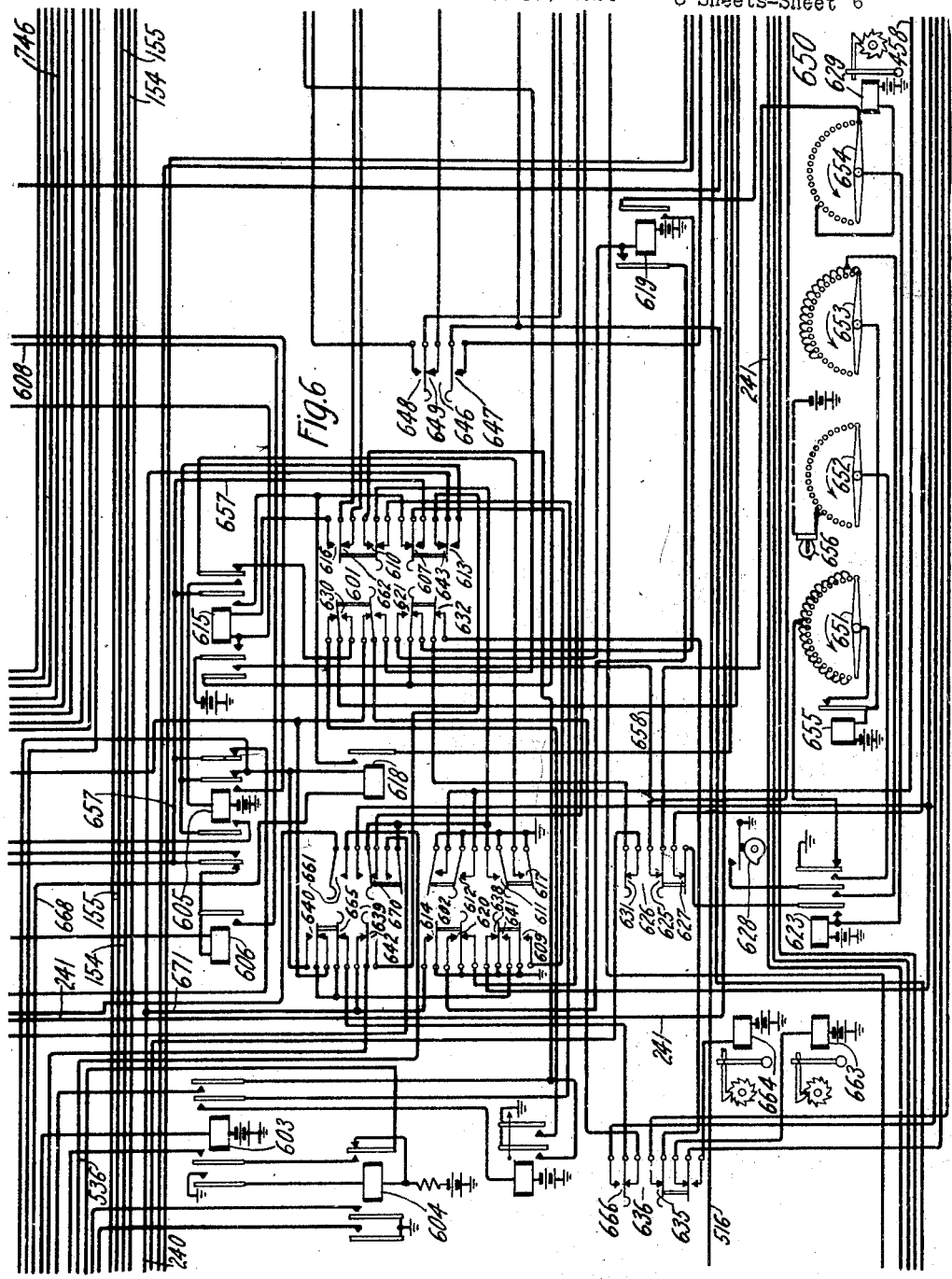
Fig. 6 shows a plurality of control keys and relays together with an alarm switch.
Figure 7:
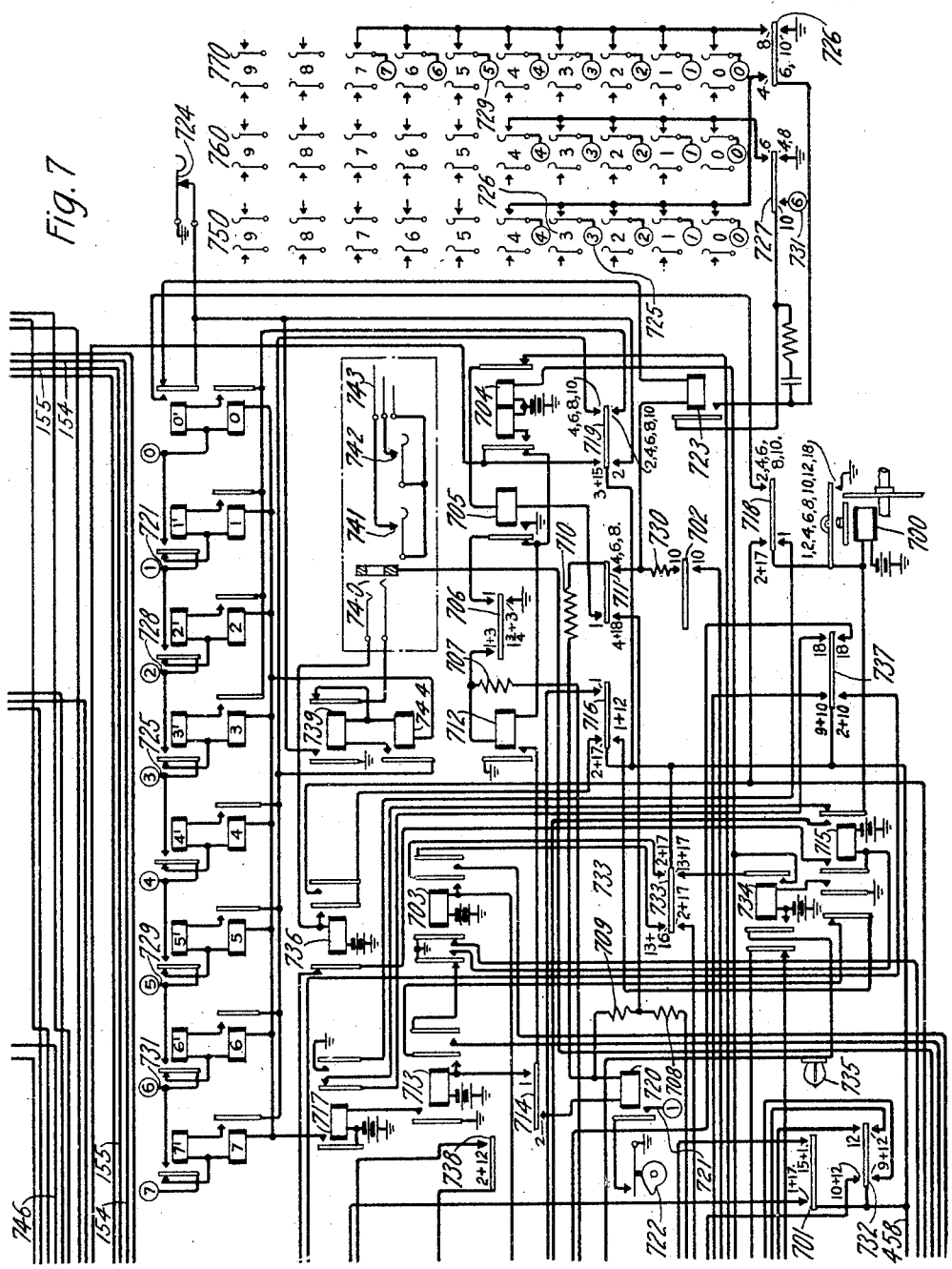
Fig. 7 shows a control sequence switch and counting relays for positioning the translator.

The keys of Fig. 7 are used in directing the selected translator to the desired terminal. The translator is operated on the revertive impulse basis as is set forth in the above identified application of W. G. Blauvelt. A fundamental circuit of the usual type is employed in setting the switch of Fig. 7 controlling an arrangement in the test set corresponding to the sender which normally functions in the setting of the translator. The counting relay circuit closed by the stepping relay 723 extends through the operated key of the key sets in the various positions of the test sequence switch. Keys are provided in Fig. 6 for enabling the tester to start a test, to restore the testing circuit to normal, to repeat each particular test, to control the advance of the test circuit when it is blocked because of faulty operation of the translator, and for other purposes.

Figure 5:
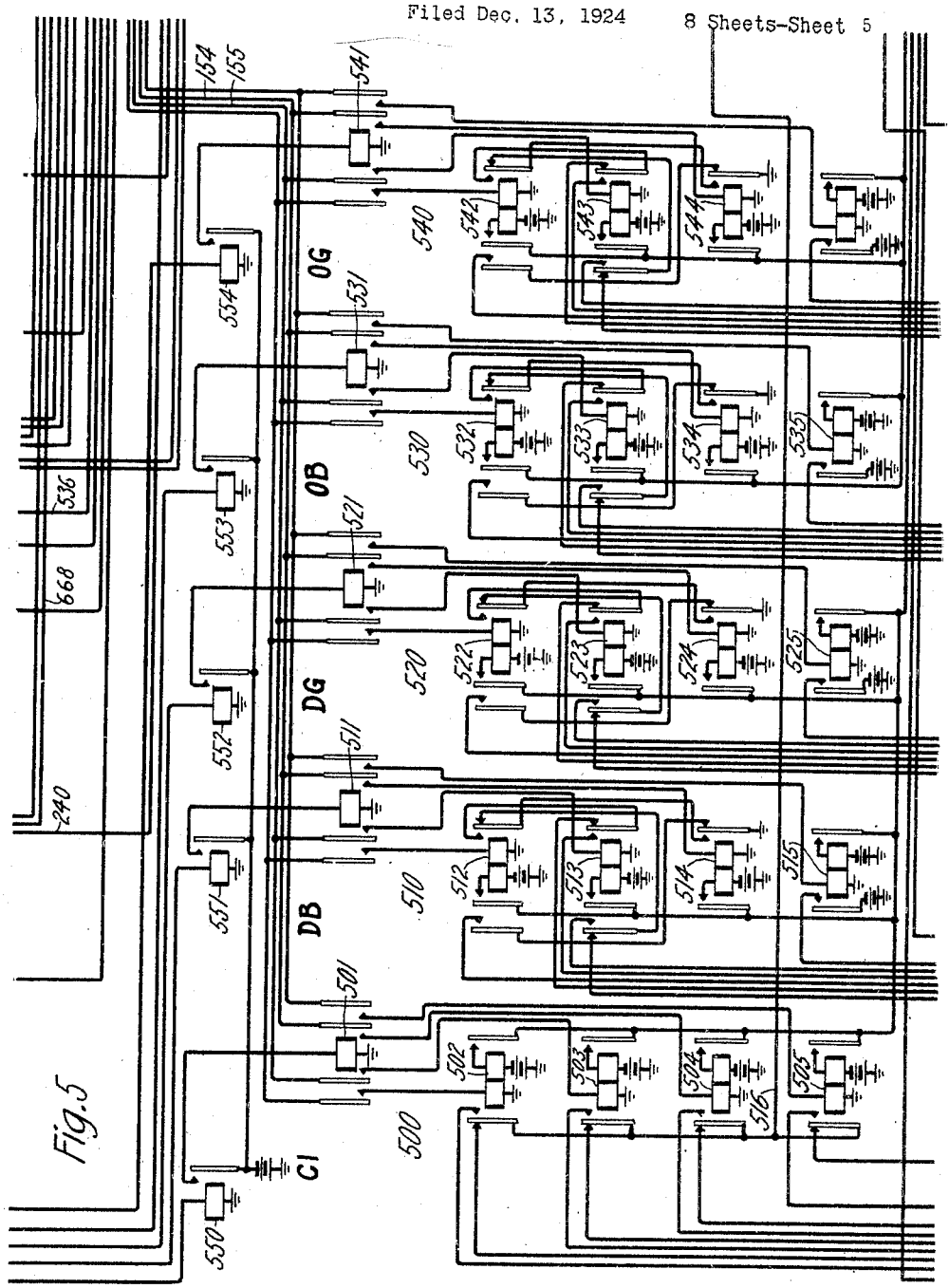
Fig. 5 shows a plurality of registers to be set by the translator.

The registers of Fig. 5 each consists of four relays. The leads which transmit the pulses for operating these relays are connected directly to the pulse machine as they do not become effective unless one of the control relays 501, 511, 521, 531 or 541 is operated at the same time. The circuits for operating the above enumerated relays extend through the master and connector switches to the translator and are completed only when the translator has been positioned. When any one of the relays 501, 511, 521, 531 or 541 is operated, a circuit is completed over the armature of the operated relay to a relay of the corresponding register. Circuits are completed through the armatures of the register relays in accordance with their setting to correspond to the digits which a register may be called upon to record.

The keys of Fig. 8 are used to check the setting of the registers. A particular combination of pulses corresponds to each particular setting of the translator and hence a particular combination of keys in the sets of Fig. 8 corresponds to a particular combination of keys in the sets of Fig. 7. The tester is supplied with tables setting forth these combinations. Hence whenever the keys of Fig. 7 are operated the corresponding keys of Fig. 8 are operated. Circuits are provided through the contacts of the operated keys, through the relays corresponding to each set and through the contacts of the register relays corresponding thereto, which are completed provided the register has been set properly. In addition a series circuit is provided through the contacts of the key set relays which is only completed if all the registers are correctly set. This circuit serves to advance the test set to test the next translator unless the repeat key or other key has been operated for the purpose of changing the routine.

The time alarm switch 650 is merely a step-by-step switch operated under the control of an interrupter to measure a sufficient length of time to complete the test of a translator, in addition to the time normally occupied by the translator in use, before operating an alarm signal.

In making a routine test of all the translators, the No. 1 master key, the No. 1 connector key, the particular circuit key 601 and the start key 602 would be operated in the above order. Any desired combination of keys of sets 750, 760 and 770 and the corresponding combination of keys of Fig. 8 would also be operated. As soon as the first translator has been tested key 601 would be restored and the testing device would continue to test the translators until stopped by some trouble condition.

A routine test of the translators of an office may be started beginning with any translator. For purposes of illustration let us assume that the test is to be started with the 45th translator. This translator will be connected to the No. 5 terminals of the third pair of connector switches. Hence the No. 3 master key 303, and the No. 5 connector key 355 are operated, after which key 601 is operated and finally start key 602. The operation of these keys completes a circuit from battery through the winding of relay 603, normal contact of stepping magnet 231, brush 237 of master selector 230 and its normal contact, right closed contact of key 303, conductor 657, contact 607 of key 601, contact 609 of key 602, to ground. The operation of relay 603 connects ground to the normal terminals of brushes 212 and 222 over its outer right front contact, contact 610 of key 601, from contact 611 of key 602. It also connects ground from its outer left front contact to the winding of relay 604, but this relay does not operate since ground is also connected to the opposite terminal of its winding over its right back contact, right back contacts of relays 218 and 228 in parallel, upper right contact of cam 701, from contact 612 of key 602. Due to the connection of ground to the normal contact of brushes 212 and 222 parallel circuits are completed for relays 218 and 228 extending from battery, through the winding of relay 218, back contact of stepping magnet 211, brush 212 and its normal contact to ground over the outer right front contact of relay 603 as previously traced, and from battery through the winding of relay 228, back contact of stepping magnet 221, brush 222 and its normal contact to ground as just traced. These relays operate and open the shunt around the winding of relay 604, permitting that relay to operate. The operation of these relays also closes a circuit from battery through the winding of stepping magnet 211, left front contact of relay 218 to ground at the outer left front contact of relay 604 and from battery through the winding of stepping magnet 221, left front contact of relay 228, to ground at the inner left front contact of relay 604. Magnets 211 and 221 energize. Since the circuits of relays 218 and 228 extend over the back contacts of the stepping magnets 211 and 221, as soon as these magnets operate the circuits of relays 218 and 228 are opened and these relays deenergize permitting in turn the deenergization of the stepping magnets and the advance of the respective switches to the first off-normal position. As soon as relays 218 and 228 close their back contacts a circuit is completed from battery through the winding of stepping magnet 231, inner left front contact of relay 603, right front contact of relay 604, right back contacts of relays 218 and 228, in parallel, upper right contact of cam 701, contact 612 of key 602 to ground. The operation of magnet 231 opens the circuit of relay 603 and that relay releases in turn releasing relay 604. The three selectors 210, 220 and 230 are now in position No. 1 and are engaging terminals extending to the first pair of connector switches. With the selectors in their No. 1 position a circuit is completed from battery through the winding of relay 603, back contact of magnet 231, brush 237 and its first contact, left normal contact of key 301, outer right back contact of relay 605, contact 607 of key 601, contact 609 of key 602 to ground. Relay 603 operates and closes parallel circuits for relays 218 and 228 extending from battery, through relay 218, back contact of magnet 211, brush 212 in its first position to the first off-normal terminal of brush 232, and from battery through the winding of relay 228, back contact of magnet 221, brush 222 in its first off normal position to the first off normal terminal of brush 232, and thence over the outer right front contact of relay 603, contact 610 of key 601, contact 611 of key 602, to ground. As before, the operation of relay 603 connects ground to the winding of relay 604 but this relay is ineffective due to a shunt circuit through the back contacts of relays 218 and 228. When now relays 218 and 228 operate in the circuit just described, relay 604 is permitted to operate. The operation of relays 218 and 228 closes circuits for operating the stepping magnets 211 and 221 which in turn open the circuits of relays 218 and 228 permitting their release and the release of the magnets, stepping switches 210 and 220 to their second position. As before, when relays 218 and 228 close their back contacts, a circuit is closed for stepping magnet 231 and switch 230 is advanced to its second position. With switches 210, 220 and 230 in their second position a circuit is again closed for relay 603 (which was released when magnet 231 operated as in the former case) extending from battery, through the winding of that relay, back contact of magnet 231, brush 237 and its second position, left normal contact of key 302, outer right back contact of relay 605, contact 607 of key 601, contact 609 of key 602 to ground. The operation of relay 603 in this circuit closes parallel circuits for relays 218 and 228 extending from battery, through the winding of relay 218, back contact of magnet 211, brush 212 in its second position to the No. 2 contact of brush 232, and from battery through the winding of relay 228, back contact of magnet 221, brush 222 in its second position, to the No. 2 contact of brush 232 and thence as previously described over the outer left front contact of relay 603, to ground at key 602. The operation of relays 218 and 228 cause the advance of switches 210 and 220 to their third position in the manner previously described, whereupon switch 230 is also advanced to its third position.

With switch 230 in its No. 3 position no circuit is completed for relay 603 since key 303 has been operated and its normal contact opened. Hence switches 210, 220 and 230 remain in their No. 3 position.

However, a circuit is now closed from battery, through the winding of relay 603, back contact of magnet 231, brush 237 and its No. 3 terminal, left alternate contact of key 303, winding of relay 606, outer left back contact of relay 605, to ground over contact 607 of key 601 and contact 609 of key 602. Due to the inclusion of relay 606 in this circuit, relay 603 is not able to operate. Relay 606 operates and connects ground over contact 609 of key 602, contact 607 of key 601, outer left back contact of relay 605, front contact of relay 606 to conductor 608 to which the right contacts of key sets 350 and 360 are connected.

Since key 355 is operated the circuit from ground just traced to conductor 608 is extended over the right closed contact of key 355, brush 235 and its No. 3 terminal, normal terminal of brush 452, back contact and winding of stepping magnet 451 to battery. Magnet 451 operates and advances switch 450 to position 1. As soon as switch 450 reaches position 1 a circuit is closed from ground, brush 453 and its No. 1 terminal, normal terminal of brush 443, back contact and winding of magnet 441 to battery. Magnet 441 operates and advances switch 440 to position 1.

As soon as switch 450 steps to position 1 the circuit above traced for magnet 451 is opened. However, a circuit is completed in position 1 from battery, through the winding and back contact of magnet 451, brush 452 and its No. 1 terminal, conductor 438, left normal contact of key 351, No. 1 terminal of brush 442, conductor 439, No. 3 terminal of brush 233, inner right back contact of relay 605, contact 613 of key 601, contact 614 of key 602 to ground. Magnet 451 operates in this circuit to advance switch 450 to position 2. In position 2 a circuit is completed from battery through the winding and back contact of magnet 441, brush 443 and its No. 1 terminal, brush 453 and its No. 2 terminal to ground advancing switch 440 to position 2.

In position 2 of switches 440 and 450, a circuit is completed from battery, winding and back contact of magnet 451, brush 452 and its No. 2 terminal, conductor 448, left normal contact of key 352, No. 2 terminal and brush 442 and thence as previously traced to ground at key 602. Switch 450 is advanced in this circuit to position 3 in turn advancing switch 440 to position 3. In position 3 a similar circuit to that above traced is completed over the No. 3 terminals of brushes 452 and 442 and the left normal contact of key 353 for advancing switch 450 to position 4 which in turn advances switch 440 to position 4. In position 4 a similar circuit is completed over the No. 4 terminals of switches 452 and 442, left normal contact of key 354, and switches 440 and 450 are advanced to position 5.

With switches 450 and 440 in position 5, since key 355 has been operated, the circuit for advancing switch 450 is open at that key and the switches are not advanced out of that position. A circuit is completed from battery, through the winding and back contact of magnet 451, brush 452 and its No. 5 terminal, conductor 449, left alternate contact of key 355, winding of relay 615, contact 616 of key 601, upper left contact of cam 701, conductor 458, contact 612 of key 602 to ground. Relay 615 operates in this circuit but magnet 451 does not. Relay 615 on operating locks from battery over its inner left front contact through its winding to ground as above traced. The operation of relay 615 closes a circuit from battery through the winding of relay 605, outer right front contact of relay 615, contact 617 of key 602 to ground. The operation of relay 605 closes a plurality of circuits for releasing the master and connector key sets 300 and 310, 350 and 360. These circuits may be traced from battery through the winding of magnet 320, outer left front contact of relay 605, conductor 657, contact 607 of key 601, contact 609 of key 602 to ground; from battery through magnet 321, inner left front contact of relay 605, contact 613 of key 601, conductor 671, contact 614 of key 602 to ground; from battery through the windings of magnets 322 and 323 in parallel, inner right contact of relay 605, contact 613 of key 601, conductor 671, contact 614 of key 602 to ground. A circuit is thereupon closed from battery through the winding and back contact of magnet 451, brush 452 and its No. 5 contact, left normal contact of key 355, No. 5 terminal and brush 442, conductor 439, terminal 3 of brush 233, winding of relay 618, conductor 668, brush 227 and its No. 3 terminal, brush 217 and its No. 3 terminal conductors 240 and 671, contact 614 of key 602 to ground. It will be noted that this circuit is only completed when the master and connector switches have all taken up the positions indicated by the keys.

When key 602 was first operated, a circuit was closed from battery, through the winding of relay 619, contact 621 of key 601, upper right contact of cam 716, conductor 458, contact 612 of key 602 to ground. Relay 619 operates and locks over its left front contact, contacts 620 of key 602 to ground.

When relay 615 operates as above described, a circuit is closed from battery through the winding of relay 623, brush 654, and its normal contact, contact 625 of key 626, conductor 658, outer left front contact of relay 615, upper right contact of cam 716, conductor 458, contact 612 of key 602 to ground. Relay 623 operates and locks over its inner right front contact, contact 627 of key 626, inner left back contact of relay 703 to ground. The operation of relay 623 closes a circuit from battery, through the winding of stepping magnet 655, brush 653 and its off-normal terminals, middle right front contact of relay 623, contact of interrupter 628 to ground. Magnet 655 operates in this circuit under control of interrupter 628 to advance switch 650 from terminal to terminal. Provided the locking circuit of relay 623 is not opened before switch 650 reaches position 17, a circuit is then completed for lamp 656 from battery through alarm apparatus (not shown), over the Nos. 17 and 18 terminals of brush 652, outer right front contact of relay 623 to ground. A circuit is also completed from battery through register 629, No. 17 terminal of brush 654, inner right front contact of relay 623, contact 627 of key 626, inner left back contact of relay 703 to ground. If the test is completed before the switch arrives in position 17, relay 703 is operated and the locking circuit of relay 623 opened, releasing that relay and closing a self-interrupting circuit through magnet 655 and its back contact, brush 651 and its off normal contacts, outer right back contact of relay 623 to ground for restoring switch 650 to normal. In the case of a trouble condition, switch 650 does not advance beyond position 18 and it is necessary to operate key 626 to open the locking circuit of relay 623, to restore the switch to normal and retire the lamp 656.

When keys 601 and 602 are first operated a circuit is also completed from battery, through the right winding of relay 704, contact 630 of key 601, outer right back contact of relay 615, contact 617 of key 602 to ground. Relay 704 is provided with a locking circuit extending from battery through the left winding and left front contact of that relay, brush 226 and thence through the selected connector switch to the selected translator, which circuit is completed when connection is established with a busy translator.

The operation of relay 615, as previously described, indicates that the desired translator has been found and that the selector brushes are resting on the terminals connected to this translator. When relay 615 operates, the energizing circuit of relay 704 is opened. If the translator of Fig. 1, which has been assumed to have been selected for testing, is busy, ground will be connected to the No. 5 terminal of brush 454 over contact 160 of make-busy jack 102 from the translator finder 150 shown in the dotted rectangle at the left of Fig. 1, to complete the locking circuit previously traced through the left winding of relay 704, holding relay 704 operated. However, if the translator of Fig. 1 is not busy, ground will not be connected to the fifth terminal of brush 454, and relay 704 will release as soon as relay 615 operates. The release of relay 704 closes a circuit from battery through the winding of relay 103, resistance 106, upper left contact of cam 105, contacts 101 and 160 of jack 102, No. 5 terminal of brush 454, No. 5 terminal of brush 226, left back contact of relay 704 and thence in parallel through the winding of relay 712, and over the left back contact of relay 705, upper contacts of cam 706, to resistance 707, contact 670 of key 639, contact 611 of key 602 to ground.

Relay 103 operates and closes a circuit from battery through the winding of relay 104, to ground at the front contact of relay 103. Relay 104 operates and closes a circuit from battery, through relay 107, outer right front contact of relay 104, upper left contact of cam 108, No. 5 contact of brush 455, conductor 460, No. 3 contact of brush 225, resistances 708, 709 and 710, upper contact of cam 711, winding of relay 705, right back contact of relay 704, contact of relay 618, inner right front contact of relay 615, contact 607 of key 601, contact 609 of key 602 to ground. Relay 705 operates in this circuit and removes the shunt around the winding of relay 712, permitting that relay to energize in the previously traced circuit of relay 103. The operation of relay 712 closes a circuit from battery through the winding of relay 713, upper contact of cam 714, contact of relay 712 to ground. Relay 713 operates and locks over its inner right front contact, outer left back contact of relay 715, lower contact of cam 716, conductor 458, contact 612 of key 602 to ground.

The operation of relay 713 also closes at its left front contact a local circuit for relay 717. Relay 717 operates and at its left front contact furnishes battery for the counting relays. It also closes a circuit from battery, winding of sequence switch magnet 700, lower contact of cam 718, outer right front contact of relay 717 to ground. Magnet 700 operates and advances the sequence switch to position 2.

The operations which have just been described constitute three tests, namely, the ability of relay 103 to operate on a minimum amount of current, the operation of relay 104 in response to the operation of relay 103 and the continuity of the circuit of relay 107 through the contact of relay 104 and sequence switch cam 108.

The translator is held busy when the test circuit advances to position 2 from ground at contact 611 of key 602, contact 670 of key 639, through resistance 707, winding of relay 712, left back contact of relay 704 and thence as traced to brush 454 and its No. 5 terminal, contact 160 of jack 102 to cam 151 of translator finder 150. This ground holds relay 103 or relay 104 energized depending upon the position of the translator sequence switch. When sequence switch 700 reaches position 3 ground is extended from contact 612 of key 602, over the upper left contact of cam 719 and the above traced circuit, holding the translator busy until the test circuit leaves position 15.

With sequence switch 700 in position 2 the circuit previously traced including relay 107 is extended through resistances 708 and 709, winding of relay 720 and lower contact of cam 714, contact of relay 712 to ground. Relay 720 operates in this circuit but the resistance of relay 720 in addition to resistances 708 and 709 is such as to produce a current flow in relay 107 just insufficient to cause that relay to operate. The operation of relay 720 closes a circuit from ground, contact of interrupter 722, contact of relay 720, conductor 721, back contact of the No. 1' counting relay, winding of the No. 1 counting relay, left front contact of relay 717 to battery, which circuit is completed when interrupter 722 closes its contact. The No. 1 counting relay operates and closes a locking circuit for itself through the No. 1' counting relay, front contact of the No. 1 counting relay, lower right contact of cam 719, conductor 458, contact 612 of key 602 to ground. When the interrupter 722 opens its contact, the No. 1' counting relay operates; when it again closes its contact the No. 0 counting relay is operated; and when it opens its contact the No. 0' counting relay is operated in the usual manner. The operation of the No. 0' counting relay closes a circuit from battery through the winding of sequence switch magnet 700, upper left contact of cam 718, front contact of the No. 0' counting relay, contact of key 724, to ground. Magnet 700 operates and advances the sequence switch to position 4. The purpose of the time interval, introduced in this manner, is to insure that relay 107 is properly adjusted not to operate even when its nonoperate current is continued for some time.

If, due to faulty adjustment, relay 107 should operate at this time it will advance sequence switch 100 to position 2. In position 2 of sequence switch 100 the ground which completes the energizing circuit of relay 104 is extended through the left front contact of that relay over the upper contacts of cam 105 to the winding of relay 103, holding that relay energized and shunting relay 712 so that relay 712 releases, opening the circuit of relay 720. This will take place before the No. 0' counting relay has had time to operate and hence the test sequence switch 700 will not be advanced to position 4 as above described. The test will therefore not be continued and the alarm switch 650 will be advanced to its No. 17 terminal to notify the test man that the test has failed.

With sequence switch 700 in position 4 the circuit of relay 107 extends as previously described to resistance 708, through that resistance alone, lower contacts of cam 711, winding of relay 723, back contact of the No. 0' counting relay, contact of key 724 to ground. This circuit is similar to the fundamental circuit customarily established in positioning a selector, relay 723 performing the same function as the stepping relay of the sender.

The key sets 750, 760 and 770 are used to control the selection of a particular set of terminals by the translator brush sets. Key set 750 controls the selection of the proper brush set, key set 760 the selection of the particular group and key set 770 of the particular terminals. The contacts of the various keys are connected to the correspondingly numbered counting relays. The keys are manually locking and remain operated as long as desired. Assume that key 3 of set 750, key 2 of set 760, and key 5 of set 770 have been depressed.

When switch 700 arrives in position 4 as above described the resistance included in the circuit of relay 107 is reduced sufficiently to permit relay 107 to operate. The operation of relay 107 closes a circuit from battery through the winding of sequence switch magnet 100, lower left contact of cam 110, left front contact of relay 107 to ground, advancing the translator sequence switch to position 2. Since sequence switch 700 has already been advanced to position 4 the connection of ground from the contact of relay 103, through the left front contact of relay 104, in shunt of the winding of relay 712 does no harm. Relay 107 closes a locking circuit for itself over its right front contact, lower contact of cam 109, to the fundamental circuit as previously traced. When sequence switch 100 reaches position 2 a holding circuit is prepared for relay 107 through its right front contact, upper right contact of cam 109, commutator strip 111, brush 112 to ground.

The operation of stepping relay 723 closes a circuit from battery, left front contact of relay 717, winding of the No. 3 counting relay, back contact No. 3' counting relay, conductor 725, contact of the No. 3 key of set 750, upper left contact of cam 726, front contact of relay 723, lower right contact of cam 727 to ground. The No. 3 counting relay operates in this circuit and closes a locking circuit for itself through the winding of the No. 3' counting relay in the usual manner. With sequence switch 100 in position 2 the circuit of the high speed updrive magnet 113 is completed from battery, winding of magnet 113, upper contact of cam 114, left front contact of relay 107 to ground. The translator brush rod is moved upward under the control of magnet 113 in its brush selecting movement.

Each time that commutator brush 112 engages a conducting segment of commutator strip 111 the holding circuit of relay 107 is closed and the stepping relay of the test set is shunted in the usual manner. When the first conducting segment is reached the No. 3' counting relay is operated, when the second is reached the No. 2', when the third the No. 1', and the fourth the No. 0' in the usual manner. When the No. 0' counting relay operates the fundamental circuit is opened and relay 107 releases in turn opening the circuit of the updrive magnet 113 stopping the translator switch in position to select the fourth set of brushes. The release of relay 107 also closes a circuit from battery through the winding of sequence switch magnet 100, upper right contact of cam 110, left back contact of relay 107 to ground advancing the translator sequence switch to position 3. With sequence switch 100 in positions 3 to 5 a circuit is completed from battery through the winding of tripping magnet 115 and right contacts of cam 116 to ground.

The operation of the No. 0' counting relay also completes a circuit from battery, through the winding of sequence switch magnet 700, upper right contact of cam 718, front contact of the No. 0' counting relay to ground at key 724. The magnet 700 operates and advances the test sequence switch to position 6. In passing from position 4 to position 6 the locking circuit of the counting relays is opened and the relays released.

In position 6 the fundamental circuit is again established and relays 107 and 723 operate. Relay 107 locks in the circuit previously traced to the fundamental circuit, and the holding circuit is prepared through the right front contact of relay 107, lower contact of cam 109, lower contact of cam 108, commutator strip 117, brush 118 to ground. The operation of relay 107 closes a circuit from battery through the winding of sequence switch magnet 100, lower left contact of cam 110, left front contact of relay 107 to ground. Sequence switch 100 is advanced in this circuit to position 4. In position 4 a circuit is completed from battery through the winding of updrive magnet 113, upper contact of cam 114, left front contact of relay 107 to ground for advancing the translator switch in its group selecting movement. Since tripping magnet 115 is operated at this time the fourth pair of brushes are tripped into operative relation with the terminals to which they have access.

When relay 723 operates it closes a circuit from battery, front contact of relay 717, winding of the No. 2 counting relay, back contact of the No. 2' counting relay, conductor 728, contact of the No. 2 key of set 760, upper contact of cam 727, contact of relay 723, lower contact of cam 726 to ground. As the translator switch is moved upward, brush 118 engages conducting segments of commutator strip 117 and stepping relay 723 is shunted in the usual manner.

When relay 723 has been shunted three times the No. 0' counting relay is operated opening the fundamental circuit releasing relays 107 and 723. The release of relay 107 opens the circuit of the updrive magnet and stops the translator switch in position to select sets of terminals in the third group. Relay 107 closes at its back contact a circuit from battery, winding of sequence switch magnet 100, upper right contact of cam 110, back contact of relay 107 to ground advancing sequence switch 100 to position 5.

The No. 0' counting relay also closes a circuit from battery through the winding of sequence switch magnet 700, upper right contact of cam 718, front contact of the No. 0' counting relay, contact of key 724 to ground, advancing sequence switch 700 to position 8.

With sequence switch 100 in position 5 and 700 in position 8 the fundamental circuit is again established and relays 107 and 723 operate. Relay 107 operated closes a locking circuit over its right front contact and lower contact of cam 109 to the fundamental circuit as before and prepares the holding circuit at its front contact and the upper right contact of cam 109, commutator strip 111 and brush 112 to ground. The operation of relay 107 at this time closes a circuit from battery through the winding of low speed updrive magnet 119, lower contact of cam 114, left front contact of relay 107 to ground. Under the control of the low speed magnet 119 the translator brush shaft is advanced in its terminal selecting movement.

Due to the operation of relay 723 a circuit is closed from battery over the left front contact of relay 717, through the winding of the No. 5 counting relay, back contact of the No. 5' counting relay, conductor 729, contact of the No. 5 key of set 770, upper right contact of cam 726, contact of relay 723, lower right contact of cam 727, to ground. Each time that brush 112 engages a conducting segment of commutator strip 111 the stepping relay 723 is shunted and a pair of counting relays operated. When relay 723 has been shunted six times the No. 0' counting relay is operated opening the fundamental circuit and closing a circuit from battery, through the winding of magnet 700, upper right contact of cam 718, front contact of the 0' counting relay to ground at key 724. Sequence switch 700 is advanced in this circuit to position 10. In moving from position 8 to position 10 sequence switch 700 opens the locking circuit of the counting relays and these relays release.

The opening of the fundamental circuit also causes the release of relay 107 which opens the circuit of the updrive magnet bringing the translator brush sets to rest on the sixth set of terminals in the selected group. The release of relay 107 also closes a circuit from battery winding of sequence switch magnet 100, upper right contact of cam 110, back contact of relay 107 to ground, advancing sequence switch 100 to position 7.

When sequence switch 100 reaches position 7 relay 107 is operated in a circuit extending from battery, through the winding of the relay, upper contacts of cam 116 to ground. Relay 107 operates and locks in a circuit extending from battery through its winding, right front contact, upper left contact of cam 109, inner right front contact of relay 104 to ground. The operation of relay 107 closes a circuit from battery, winding of sequence switch magnet 100, lower left contact of cam 110, left front contact of relay 107 to ground, advancing sequence switch 100 to position 8. When sequence switch 100 arrives in position 8 the leads from the pulse machine drum are extended through the translator brushes to the test circuit.

With sequence switch 700 in positions 9 and 10 a circuit is completed from battery, through the winding of relay 201, upper left contact of cam 737, conductor 458, contact 612 of key 602 to ground. Relay 201 operates and extends the circuits from the pulse machine to the registers of Fig. 5.

As is set forth in detail in U. S. Patent No. 1,395,977 to F. A. Stearn and F. J. Scudder, the pulse machine 120 consists of a cylinder of insulated material in which are embedded rings of conducting segments in various combinations. The brushes which wipe over these conducting segments are cross connected to the terminals to which the translators have access in such a manner as to cause the proper registration to take place to select an outgoing trunk to the office indicated by the office code. Assuming that the translator has been set on the terminals which have been shown in full, certain circuits will be completed as described in detail later.

Brush 121 wipes over a row of segments equal in number to the maximum which are distributed around the circumference of the cylinder and slightly offset from the rows of terminals used in setting the registers. A circuit is completed through this strip of terminals extending from battery, over brush 122, conducting strip 123, through a contact of row 125, brush 121, contact of cam 124, No. 5 terminal of brush 457, conductor 461, No. 3 terminal of brush 216, conductor 241, contacts of cam 702, resistance 730, winding of stepping relay 723, back contact of the No. 0' counting relay to ground at key 724. When brush 121 first encounters a conducting segment of row 125 and the above circuit is completed, relay 723 operates and closes a circuit from battery through the left front contact of relay 717, winding of the No. 6 counting relay, back contact of the No. 6' counting relay, conductor 731, lower left contact of cam 727, front contact of relay 723, lower right contact of cam 726 to ground. Since there are six conducting segments in row 125 and it takes 7 deenergizations of relay 723 to bring about the operation of the 0' counting relay, the pulse machine will be connected with the registers of Fig. 5 during at least one complete revolution of the drum 120. Assuming for convenience that at the time the circuits from the pulse machine to the registers of Fig. 5 are completed, the brushes are in the position shown in the figure, the following circuits will be completed when the brushes encounter the first vertical row of conducting segments; from battery, brush 122, ring 123, segment 126, brush 127, conductor 154, to the inner right armatures of relays 501, 511, 521, 531 and 541; battery, brush 122, ring 123, segment 128, brush 129, translator brush 130, contact of cam 131, No. 5 terminal of brush 446, conductor 462, No. 3 terminal of brush 214, inner contact of relay 201, winding of relay 554 to ground; battery, brush 122, ring 123, segment 132, brush 133, translator brush 142, contact of cam 143, No. 5 terminal of brush 445, conductor 463, No. 3 terminal of brush 215, next to the innermost contact of relay 201, winding of relay 553, to ground; battery, brush 122, ring 123, segment 132, brush 133, translator brush 134, contact of cam 135, No. 5 terminal of brush 456, No. 3 terminal of brush 224, middle contact of relay 201, winding of relay 552, to ground; battery, brush 122, ring 123, segment 132, brush 133, translator brush 136, contact of cam 137, No. 5 terminal of brush 444, No. 3 terminal of brush 213, outermost contact of relay 201, winding of relay 550 to ground. Relays 550, 552, 553 and 554 operate. Relay 550 closes a circuit from battery over its front contact, winding of relay 501 to ground. Relay 552 closes a circuit over its front contact through the winding of relay 521 to ground. Relay 553 closes a circuit over its front contact through the winding of relay 531 and relay 554 closes a circuit for operating relay 541. Due to the operation of relays 501, 521, 531 and 541 the circuit from battery which was traced as far as the inner right armatures of these relays is extended thereover to the left winding of relay 504, right winding of relay 524, right winding of relay 534, right winding of relay 544 to ground.

Relays 504, 524, 534 and 544 operate and lock to ground over the lower left contact of cam 732, conductor 458 and contact 612 of key 602. When the brushes of the pulsing machine disengage the first row of terminals, relays 550, 552, 553 and 554 release in turn releasing relays 501, 521, 531 and 541. When the brushes engage the second vertical row of segments the following circuits are completed: battery brush 122, ring 123, segment 138, brush 139, conductor 155, to the inner left armatures of relays 501, 511, 521, 531 and 541; battery brush 122, ring 123, segment 140, brush 129, translator brush 130, contact of cam 131, No. 5 contact of brush 446, conductor 462, No. 3 contact of brush 214, innermost contact of relay 201, winding of relay 554 to ground; battery, brush 122, ring 123, segment 141, brush 133, translator brush 142, contact of cam 143, No. 5 terminal of brush 445, conductor 463, No. 3 terminal of brush 215, next to the innermost contact of relay 201, winding of relay 553 to ground; from brush 133 to translator brush 136, contact of cam 137, No. 5 terminal and brush 444, No. 3 terminal of brush 213, outermost contact of relay 201, winding of relay 550 to ground; and from brush 133 to translator brush 134, contact of cam 135, No. 5 terminal of brush 456, No. 3 terminal of brush 224, middle contact of relay 201, winding of relay 552 to ground. Relays 550, 552, 553 and 554 operate in turn causing the operation of the corresponding relays 501, 521, 531 and 541. The operation of these latter relays extends the circuit completed from segment 138 to their inner left armatures to the left winding of relay 503, right winding of relay 523, right winding of relay 533, right winding of relay 543, to ground. Relays 503, 523, 533 and 543 operate and lock to ground at contact 612 of key 602.

Without tracing the circuits in detail it will be readily seen that when the pulse machine brushes engage the third vertical row of segments battery is connected over segments 144 and brush 145 to the outer right armatures of relays 501, 511, 521, 531 and 541. Relay 551 is operated from segment 148 in turn operating relay 511 to bring about the operation of relay 515. When the fourth vertical row of terminals is engaged battery is extended over segment 146 and brush 147 to the outer left armatures of relays 501, 511, 521, 531 and 541 and relay 551 is operated so that register relay 512 is operated and locked. When the fifth and sixth rows of terminals are engaged no circuit is completed to the armatures of relays 501, 511, 521, and 531 and hence although battery may be connected through other segments to the translator brushes no register relay is operated due to these last two rows of terminals.

Meanwhile as each segment of row 125 is engaged by brush 121 a pair of counting relays is operated and locked. When the first segment of this row is again engaged by brush 121 the No. 0 counting relay is operated and when disengaged the No. 0' counting relay is operated. The operation of the No. 0' counting relay opens the circuit of relay 723 and closes a circuit from battery, through the winding of sequence switch magnet 700, upper right contact of cam 718, front contact of the No. 0' counting relay to ground at key 724, to advance sequence switch 700 to position 12. When sequence switch 700 leaves position 10 the circuit of relay 201 is opened and that relay releases, disconnecting the registers from the pulse machine.

The tester in furnished with a table which shows the keys of Fig. 8 corresponding to a particular setting of the translator. When the keys, No. 3 of set 750, No. 2 of set 760 and No. 5 of set 770, are operated the corresponding keys of the set of Fig. 8, that is key 812 of set 810, key 821 of set 820, key 831 of set 830, key 841 of set 840 and key 851 of set 850 are likewise operated. As soon as the relays of register 500 have been operated a circuit is completed for moving sequence switch 800 into a position corresponding to the class indicated on register 500.

Assuming that sequence switch 800 is standing in position 3 from a previous test, due to the operation of the relays of register 500, a circuit will be completed from battery, through the winding of magnet 800, lower left contact of cam 801, back contact of relay 502, conductor 516 upper left contact of cam 732, conductor 458, to ground at contact 612 of key 602, advancing switch 800 to position 4. In position 4 a circuit is completed over the upper right contact of cam 802, back contact of relay 505 to the same ground. Sequence switch 800 is driven out of position 5 in the circuit for driving it out of position 3. It is driven out of position 6 by a circuit over the upper left contact of cam 801, front contact of relay 503, to the same ground. The two paths for driving sequence switch 800 out of position 7 which extend from the left contacts of cam 802, are both open, one at the back contact of relay 504 and the other at the front contact of relay 505 so that sequence switch 800 comes to rest in position 7.

Assuming that the translator has operated perfectly a circuit is completed from battery, through the winding of relay 811, contact of key 812, lower left contact of cam 803, upper right contact of cam 732, conductor 458, to ground at contact 612 of key 602. Relay 811 operates and closes a circuit from battery over its right front contact, through lamp 813, resistance 814 to ground indicating that the class register relays have been correctly operated.

A circuit is likewise completed from battery, left front contact of relay 515, right contact of key 821, winding of relay 822, left contact of key 821, outer left front contact of relay 512, right back contact of relay 514 to ground. Relay 822 operates and closes a circuit from battery over its front contact, through lamp 823, resistance 824, to ground indicating that the district brush register was correctly set.

A circuit is also completed from battery, right contact of key 831, winding of relay 832, left contact of key 831, outer left front contact of relay 523, right back contact of relay 522, right front contact of relay 524 to ground. Relay 832 operates and closes a circuit from battery over its contact, through lamp 833, resistance 834, to ground indicating that the district group register has been correctly operated.

In addition, a circuit is completed from battery, right contact of key 841, winding of relay 842, left contact of key 841, outer left front contact of relay 533, right back contact of relay 532, right front contact of relay 534 to ground. Relay 842 operates and closes a circuit from battery over its contact, through lamp 843, resistance 844 to ground indicating that the office brush register has been correctly set.

Another circuit is also closed from battery, right contact of key 851, winding of relay 852, left contact of key 851, outer left front contact of relay 543, right back contact of relay 542, right front contact of relay 544 to ground. Relay 852 closes a circuit from battery, over its front contact, lamp 853, resistance 854 to ground indicating that the office group register has been correctly set.

If all the registers are operated to correspond to the setting of the keys of Fig. 8, a circuit is completed from ground at the left armature of relay 811, over its left front contact, left front contact of relay 822, left front contact of relay 832, left front contact of relay 842, left front contact of relay 852, winding of relay 703 to battery. Relay 703 operates and locks through its inner right contact, upper right contact of cam 733, conductor 458 to ground at contact 612 of key 602.

The operation of relay 703 closes a circuit from battery through the winding of relay 715, outer left front contact of relay 703 to ground causing that relay to operate. Relay 715 closes an obvious circuit for relay 734 which in turn closes a circuit from battery, over its inner left front contact, through lamp 735, resistance 804 to ground. The operation of relay 703 also opens the locking circuit of relay 623, permitting that relay to release. The release of relay 623 closes a self-interrupting circuit from battery through the winding and back contact of stepping magnet 655 of the time alarm switch, brush 651 and its strapped off-normal terminals, outer right back contact of relay 623 to ground, restoring the time alarm switch to normal. The operation of relay 715 opens the locking circuit of relay 713 which in turn releases relay 717 and removes battery from the windings of the counting relays.

If a routine test is to be made beginning with the 65th translator, as soon as the OK lamp 735 lights the tester releases key 601. With key 601 restored, the operation of relay 715 closes a circuit from battery through the winding of sequence switch magnet 700, right front contact of relay 715, contact 649 of key 646, contact of cam 738, contact 662 of key 601, upper left contact of cam 701, conductor 458, to ground at contact 612 of key 602. Sequence switch 700 moves out of position 12 and continues to position 18 under the control of its master cam. The restoration of key 601 also opens the locking circuit of relay 615, in turn releasing relay 605.

When sequence switch 700 leaves position 15, the holding circuit of relay 104 is opened at cam 719 and relay 104 releases. The release of relay 104 opens the locking circuit of relay 107, which relay closes at its back contact a circuit from battery, through the winding of sequence switch magnet 100, upper right contact of cam 110, left back contact of relay 107 to ground. Magnet 100 operates and advances the translator sequence switch to position 9. In position 9 the circuit of down drive magnet 151 is completed from battery, winding of magnet 151, upper contacts of cam 152, left back contact of relay 107 to ground. The translator switch is restored to normal under the control of magnet 151. When the switch reaches normal a circuit is completed from battery, through the winding of sequence switch magnet 100, lower right contact of cam 110, commutator segment 153, brush 118 to ground, advancing the sequence switch to position 10 which is a second normal position. The translator is now available for use in regular service.

As switch 700 passes through positions 13 to 16 a circuit is completed from battery, winding of stepping magnet 451, No. 3 contact of brush 234, contact 631 of key 626, contact 632 of key 601, contact 635 of key 636, outer right front contact of relay 703, upper left contact of cam 733, conductor 458, to ground at contact 612 of key 602. Magnet 451 operates and steps switch 450 to its next terminal. With switch 450 in position 6 a circuit is completed from battery, through the winding and back contact of magnet 441, No. 5 terminal and brush 443, No. 6 terminal and brush 453 to ground advancing switch 440 to position 6.

When sequence switch 700 leaves position 17 relay 703 releases, in turn releasing relays 715 and 734. When relay 715 closes its back contact a circuit is completed from battery, winding of magnet 700, right back contact of relay 715, inner right back contact of relay 717, upper right contact of cam 737, conductor 458 to ground at contact 612 of key 602. Sequence switch 700 is advanced to position 1 in this circuit. With relays 713 and 717 released and switch 700 in position 1 the circuit previously traced for relay 704 to test for a busy condition of the translator is prepared as previously described and the tests are now repeated on the next translator.

If another particular translator is to be tested, when the OK lamp 735 lights, key 602 is restored and key 601 left operated. The restoration of key 602 closes contact 638 of that key and connects ground through the upper left contact of cam 718 to the winding of sequence switch magnet 700, driving the sequence switch to position 18. It also opens the locking circuit of relay 703 permitting relays 715 and 734 to release. When sequence switch 700 leaves position 17 the locking circuit of relay 615 is opened and that relay releases in turn releasing relay 605.

The proper master key of set 300 or 310 and the proper connector key in set 350 or 360 are now operated, after which start key 602 is reoperated. If the next translator to be tested is connected to the same connector switches as that last tested, the operation of the master key will open the circuit of relay 603 and prevent the advance of the master switch. The reoperation of key 602 closes a circuit from battery, through the winding and back contact of stepping magnet 451, brush 452 and its No. 5 terminal, conductor 449, left normal contact of key 355, No. 5 terminal of brush 442, conductor 439, No. 3 terminal of brush 233, inner right back contact of relay 605, contact 613 of key 601, contact 614 of key 602 to ground. Magnet 451 operates and steps the switch to its next position. If, for example, key 365 has been operated, successive similar paths will be closed until the switch reaches the position corresponding to key 365 whereupon no path will be available and the switch comes to rest in that position. Switch 440 will be advanced to the corresponding position in the manner previously described. In the meantime, the restoration and re-operation of key 602 closes the previously traced circuit for advancing sequence switch 700 from position 18 to position 1 and the circuit for testing the translator for a busy condition is again prepared.

If the particular translator to be tested is on a different connector switch from the one last tested, the reoperation of key 602 will close a circuit from battery through the winding of relay 603, back contact of magnet 231, brush 237 and its No. 3 terminal, left normal contact of key 303, outer right back contact of relay 605, contact 607 of key 601, contact 609 of key 602 to ground. Relay 603 operating, closes the circuits through relays 218 and 228 for advancing master switches 210 and 220 to their next terminals. Master switch 230 is then advanced to its No. 4 terminal in the manner previously described.

The circuit of relay 603 is opened when magnet 233 operates, but a new circuit is closed through the succeeding terminals of brush 237 until the position is reached corresponding to the master key operated. The subsequent operation is the same as that previously described for advancing a connector to the desired translator.

If the next translator to be tested appears earlier in the arrangement, it is necessary to return the testing apparatus to normal before selecting the translator. To accomplish this, the return-to-normal key 639 is operated. The operation of this key closes a circuit from battery through the winding of stepping magnet 451 and its back contact, brush 452 and its No. 5 terminal, conductor 449, left normal contact of key 355, No. 5 terminal of brush 442, No. 3 terminal of brush 233, contact 640 of key 639, contact 641 of key 602 to ground. Since all of the keys of sets 350 and 360 are normal at this time, when switch 450 reaches its No. 6 terminal and switch 440 is advanced to its No. 6 terminal in the manner previously described, a new circuit is completed over the No. 6 terminals of brushes 452 and 442 and the left normal contact of the No. 6 key of set 350 to advance switch 450 to position 7 and so on until switches 450 and 440 reach position 21.

When switch 440 reaches position 21 a circuit is completed from battery, through the winding of relay 603, back contact of magnet 231, brush 237 and its No. 3 contact, No. 21 terminal of brush 447 to ground. Relay 603 operates and causes the advance of master switches 210, 220, 230 to the No. 4 terminals in the manner previously described. With switch 230 on its No. 4 terminal a circuit is completed from battery, winding and back contact of magnet 451, brush 452 and its No. 21 terminal, No. 4 terminal of brush 223 to ground. Switch 450 is advanced to normal and in turn advances switch 440 to normal. Key 601 is now restored, and a circuit completed from battery, winding of relay 603, back contact of magnet 231, conductor 536, contact 661 of key 639, first set of off normal contacts of brush 236, contact 642 of key 639, contact 643 of key 601, contact 614 of key 602 to ground. The operation of relay 603 causes the advance of switches 210, 220 and 230 to the next set of terminals where the circuit is again established until the switch 230 leaves the first group of translators.

When brush 236 encounters the first terminal corresponding to the second group of translators, the circuit is extended from the winding of relay 603, back contact of magnet 231, the strapped terminals of the second group and brush 236, contact 642 of key 639, contact 643 of key 601, contact 614 of key 602 to ground. The above circuit serves to advance the master switches to their No. 21 terminals. When a key of set 300 or 310 is operated to select the next translator for test a circuit is completed from battery through relay 603, back contact of magnet 231, brush 237 and its No. 21 terminal, contact of the operated key, contact 607 of key 601, contact 609 of key 602 to ground. This circuit advances the master switches to normal. The advance to normal after a routine test is accomplished through a circuit (not shown) including the No. 21 terminal of brush 236 and the No. 21 terminal of the last connector switch.

In case the translator fails to operate correctly at any point the test circuit will not advance to the next position. This advance is in most cases under the control of the counting relays. If the circuit does not advance properly, the time alarm switch 650 is permitted to reach its No. 17 terminal and to light the lamp 656 and sound an alarm (not shown). When the alarm signal is observed, key 626 is operated, opening the locking circuit of relay 623, retiring the signal and permitting the restoration of the time alarm switch to normal. The tester then either makes a note of the trouble encountered or corrects it, if possible. Inserting a plug in make-busy jack 102 removes the faulty translator from service, and holds it busy to finder 150 after switch 450 has advanced to another translator.

The test is permitted to proceed by the operation of key 646. The operation of this key closes a circuit from battery, through the winding of relay 703, contact 647 of key 646, lower left contact of cam 733, conductor 458, to ground at contact 612 of key 602. Relay 703 operates and locks over its inner right contact, upper right contact of cam 733, conductor 458 to ground at contact 612 of key 602. The operation of relay 703 closes a circuit for operating relay 715 which in turn causes the operation of relay 734. With relay 715 operated a circuit is closed, provided sequence switch 700 is in positions 2 to 10, from battery, through the winding of sequence switch magnet 700, right front contact of relay 715, contact 648 of key 646, lower left contact of cam 737 to ground at contact 612 of key 602. Sequence switch 700 advances in this circuit to position 12.

If it is decided to reserve repairs until later, key 646 is now restored completing a circuit from battery, through the winding of magnet 700, right front contact of relay 715 contact 649 of key 646, contact of cam 738, contact 662 of key 601, upper left contact of cam 701, conductor 458 to ground at contact 612 of key 602. Sequence switch 700 is brought to position 18 in this circuit and in moving from position 12 to position 18 advances the connector switch to the next translator in the manner previously described. The sequence switch is then restored to position 1.

If the trouble is such that it can be corrected at once, it is desirable to retest the translator to make sure that the repair has been successful. To do this, repeat key 636 is operated before key 646 is restored. The operation of key 636 opens the circuit for advancing switch 450 to the next translator and hence the tests are repeated on the same translator. As long as key 636 remains operated the test circuit will continue testing the same translator unless trouble is encountered. The operation of key 636 also transfers the metering circuit from meter 663 to meter 664 so that the repeat tests are recorded on the latter meter.

It is sometimes desirable to make the translator tests from a position where the operation of the translator itself may be observed. In order to do so, keys 636 and 724 are operated. The operation of key 636 connects ground, from contact 641 of key 602, contact 665 of key 639, over contact 666 of key 636 to the sleeve of jack 740. The operation of key 724 removes ground from the armature of the No. 0' counting relay and places the connection of ground thereto under the control of relay 739. The keys 741 and 742 are located in a portable box and are connected by a cord and plug 743 to jack 740 which is located at the translator test set frame. With the test set directed to a particular translator, key 742 is operated, closing a circuit from battery, front contact of relay 717, which was operated when the set connected with the translator, winding of relay 744, right back contact of relay 739, ring of jack 740, ring of plug 743, contact of key 742, sleeve of plug 743, sleeve of jack 740 to ground. Relay 744 operates and closes a locking circuit for itself from battery, through its winding, winding of relay 739, front contact of relay 744, upper right contact of cam 719, to ground at contact 612 of key 602.

When key 742 is released relay 739 operates in this locking circuit and connects ground to the armature of the No. 0' counting relay. The operation of relay 739 to connect ground to the armature of the No. 0' counting relay completed the fundamental circuit through the winding of relay 723 and permits brush selection to take place. When the No. 0' counting relay operates and switch 700 moves out of position 4 the counting relays and relays 744 and 739 are released. The switch comes to rest in position 6. It is necessary to again operate key 742 in order to permit group selection to take place, and similarly to permit terminal selection. The circuit then functions as previously described until it again reaches position 4 in a new test.

Should trouble be encountered the operation of key 741 completes a circuit from ground on sleeve of jack 740, sleeve of plug 743, contact of key 741, tip of plug 743 and jack 740, winding of relay 736 to battery. Relay 736 operates and locks over its inner right contact, upper left contact of cam 716, conductor 458, contact 612 of key 602 to ground. The operation of relay 736 also closes a circuit from battery through the winding of sequence switch magnet 700, upper left contact of cam 718, outer right contact of relay 736, upper left contact of cam 716, conductor 458, to ground at contact 612 of key 602, restoring the sequence switch to normal and disconnecting the test set from the translator in trouble.

If all translators are to be tested, master key 1 and connector key 1 will be operated and the procedure will be as above described.

What is claimed is:

1. In a testing device for testing translators, means to automatically select one of a plurality of said translators, means for testing said translators, means to control the automatic and progressive selection and test of the remainder of the translators, and means to arrest said progressive selection when the last of said remainder of translators has been tested.

2. In a testing device for testing translators, automatic switches for progressively connecting said testing device with said translators, means for operating said switches to select a particular translator, means to control said switches to automatically and progressively select the remainder of said translators, and means for testing said translators.

3. In a testing device for testing translators, a pair of automatic switches used simultaneously to connect said testing device with any one of a plurality of said translators, means to operate the first of said switches over a circuit which is completed only when both switches are in position to connect with the same translator, and means under the control of said first switch for moving the second of said switches to a corresponding position.

4. In a testing device for testing translators, a plurality of master switches, a plurality of sets of connector switches, means for operating said master switches and one of said sets of connector switches to connect said testing device with a particular one of a plurality of translators and means for initiating the test of said translators, which means is effective only when all of said master switches and all of the switches of the selected set of connector switches are positioned to connect with the same translator.

5. In a testing device for testing translators, a plurality of master switches, a plurality of sets of connector switches, means for operating said master switches and one of said sets of connector switches to connect the testing device with a particular one of a plurality of translators, a relay for controlling the initiation of a test on said translator, and means for operating said relay over a circuit completed only when said master switches and said selected set of connector switches are in position to connect with the same translator.

6. In a testing device for testing translators, means for connecting said testing device with any one of said translators, means operative to set the apparatus of a translator thus connected, registers, means under the control of said translator for operating said registers and means for indicating whether said registers have been correctly operated.

7. In a testing device for testing translators, means for connecting said testing device with any one of said translators, means operative to set the apparatus of a translator thus connected, registers, means under the control of said translator for operating said registers, a signal individual to each register, and means to actuate said signal over a circuit completed by the corresponding register when said register is correctly operated.

8. In a testing device for testing translators, means for connecting said testing device with any one of said translators, means operative to set the apparatus of a translator thus connected, registers, means under the control of said translator for operating said registers, a signal individual to each register, means to actuate said signal over a circuit completed by the corresponding register when said register is correctly operated, a check signal, and means effective to actuate said check signal when all the said registers have been correctly operated.

9. In a testing device for testing translators, means for connecting said testing device with any one of said translators, means operative to set the apparatus of a translator thus connected, registers, means under the control of said translator for operating said registers, a signal individual to each register, means to actuate said signal over a circuit completed by the corresponding register when said register is correctly operated, a check signal, and means to actuate said check signal when all of said registers have been correctly operated, and to control the restoration of the testing device to normal.

10. In a testing device for testing translators, means for connecting said testing device with any one of said translators, means operative to set the apparatus of a translator thus connected, registers, means under the control of said translator for operating said registers, a signal individual to each register, means to actuate said signal over a circuit completed by the corresponding register when said register is correctly operated, a check signal, means to actuate said check signal and to advance the testing device to the next translator, when all of said registers have been correctly operated.

11. In a testing device for testing translators, means for connecting said testing device with any one of said translators, means to actuate said translator to take up a particular position, a plurality of registers, means for variably operating said registers in accordance with the position taken by said translator, and means for indicating whether said registers have been correctly operated.

12. In a testing device for testing translators, means for connecting said testing device with any one of said translators, means to actuate said translator to take up a particular position, a plurality of registers, means for variably operating said registers in accordance with the position taken by said translator, a signal individual to each register, means to actuate said signal over a circuit completed by the corresponding register when said register is correctly operated.

13. In a testing device for testing translators, means for connecting said testing device with any one of said translators, means to actuate said translator to take up a particular position, a plurality of registers, means for variably operating said registers in accordance with the position taken by said translator, a signal individual to each register, means to actuate said signal over a circuit completed by the corresponding register when said register is correctly operated, a check signal, and means to actuate said check signal when all of said registers have been correctly operated, and to control the restoration of the testing device to normal.

14. In a testing device for testing translators means for connecting said testing device with any one of said translators, means to actuate said translator to take up a particular position, a plurality of registers, means for variably operating said registers in accordance with the position taken by said translator, a signal individual to each register, means to actuate said signal over a circuit completed by the corresponding register when said register is correctly operated, a check signal, and means to actuate said check signal when all of said registers have been correctly operated, and to actuate the testing device to advance it to the next translator.

15. In a testing device for testing translators means for connecting said testing device with any one of said translators, means to actuate said translator to take up a particular position, a plurality of registers, means for variably operating said registers in accordance with the position taken by said translator, a key set operated in accordance with said translator actuating means to check the setting of each register, a signal individual to each register, means to actuate said signal over a circuit including the corresponding key set and register, which circuit is completed only when the register is correctly operated.

16. In a testing device for testing translators means for connecting said testing device with any one of said translators, means to actuate said translator to take up a particular position, a plurality of registers, means for variably operating said registers in accordance with the position taken by said translator, a key set operated in accordance with the translator actuating means to check the setting of each register, a signal individual to each register, means to actuate said signal over a circuit including the corresponding key set and register, which circuit is completed only when the register is correctly operated, a check signal, and means to actuate said check signal when all of said registers have been correctly operated, and to control the restoration of the testing device to normal.

17. In a testing device for testing translators, means for connecting said testing device with any one of said translators, means to actuate said translator to take up a particular position, a plurality of registers, means for variably operating said registers in accordance with the position taken by said translator, a key set operated in accordance with said translator actuating means to check the setting of each register, a signal individual to each register, means to actuate said signal over a circuit including the corresponding key set and register, which circuit is completed only when the register is correctly operated, a check signal, and means to actuate said check signal when all of said registers have been correctly operated, and to actuate the testing device to advance it to the next translator.

In witness whereof, I hereunto subscribe my name this 10th day of December A. D., 1924.

ERIC R. LUNDIUS.